US009413840B2

(12) United States Patent
Taylor et al.

(10) Patent No.: US 9,413,840 B2
(45) Date of Patent: Aug. 9, 2016

(54) ARCHITECTURE FOR SHARING BROWSING SESSION HISTORIES

(71) Applicant: Amazon Technologies, Inc., Reno, NV (US)

(72) Inventors: Brett Richard Taylor, Bainbridge Island, WA (US); Peter Frank Hill, Seattle, WA (US); Ameet Nirmal Vaswani, Seattle, WA (US); Samuel John Young, Seattle, WA (US); Aaron Michael Brown, Seattle, WA (US); Steven Michael Reddie, Issaquah, WA (US); Matthew Lloyd Trahan, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 340 days.

(21) Appl. No.: 13/751,681

(22) Filed: Jan. 28, 2013

(65) Prior Publication Data
US 2014/0214919 A1 Jul. 31, 2014

(51) Int. Cl.
*H04L 29/08* (2006.01)
*H04L 12/58* (2006.01)
*G06F 17/30* (2006.01)

(52) U.S. Cl.
CPC ...... *H04L 67/2814* (2013.01); *G06F 17/30873* (2013.01); *H04L 51/02* (2013.01); *H04L 67/02* (2013.01); *H04L 67/14* (2013.01); *H04L 51/16* (2013.01)

(58) Field of Classification Search
USPC .......................... 709/219, 225, 203, 204, 206
See application file for complete search history.

(56) References Cited

U.S. PATENT DOCUMENTS

| 8,060,463 | B1 | 11/2011 | Spiegel |
| 8,805,828 | B1* | 8/2014 | Ngo et al. ............... 707/724 |
| 2002/0138617 | A1* | 9/2002 | Christfort et al. ........... 709/225 |
| 2003/0081000 | A1* | 5/2003 | Watanabe et al. ........... 345/751 |
| 2003/0197735 | A1* | 10/2003 | Woltzen ............... 345/777 |
| 2007/0124693 | A1* | 5/2007 | Dominowska .... G06F 17/30867 715/772 |
| 2008/0028334 | A1 | 1/2008 | De Mes |
| 2009/0241032 | A1* | 9/2009 | Challener et al. ........... 715/751 |

(Continued)

OTHER PUBLICATIONS

Max Van Kleek, Aug. 28, 2009, Collective Intelligence, News, Social Computing, Web Architecture.*
EyeBrowse: Record, Visualize and Share your Browser History, Information Aesthetics, Sep. 18, 2009, 2 pages, printed on Jan. 25, 2013.

(Continued)

*Primary Examiner* — Yemane Mesfin
*Assistant Examiner* — Peter Chen
(74) *Attorney, Agent, or Firm* — Knobbe Martens Olson & Bear LLP

(57) ABSTRACT

Features are disclosed for enabling users to efficiently store and share browsing sessions or portions thereof with other users or the general public. Browsing session requests and other activities may be sent to an intermediary system, which can retrieve requested content and store a representation of the requested content or data regarding the requested content. The stored data may be organized as a saved browsing session such that users may access the shared browsing session at a subsequent time and view the browsing session substantially in its entirety. Users may search for shared browsing sessions and access data regarding the requests made during a browsing session. In addition, data regarding client devices used during shared browsing sessions may be tracked and associated with the shared browsing sessions such that subsequent users can search for shared browsing sessions based partly on such device characteristics.

32 Claims, 6 Drawing Sheets

(56) References Cited

U.S. PATENT DOCUMENTS

| | | | |
|---|---|---|---|
| 2011/0055177 A1* | 3/2011 | Chakra et al. | 707/695 |
| 2011/0289157 A1* | 11/2011 | Pirnazar | 709/206 |
| 2012/0136941 A1* | 5/2012 | Howes et al. | 709/206 |
| 2012/0210243 A1* | 8/2012 | Uhma | G06F 17/30893 715/744 |
| 2013/0018960 A1* | 1/2013 | Knysz et al. | 709/204 |
| 2013/0254685 A1* | 9/2013 | Batraski et al. | 715/760 |
| 2014/0149506 A1* | 5/2014 | Yuan | H04L 67/06 709/204 |

OTHER PUBLICATIONS

Van Kleek, M, Introducing "EyeBrowse"—Track and share your web browsing in real time, Haystack Blog, Aug. 28, 2009, 3 pages, printed on Jan. 25, 2013.

Brinkmann, M, "Record and Share your browser history with Hooeey," ghacks.net, Feb. 26, 2008, 6 pages, printed on Jan. 25, 2013.

Considine, A, "The Footprints of Web Feet," The New York Times, Mar. 4, 2011, 3 pages, printed on Jan. 25, 2013.

International Search Report and Written Opinion in International Appl. PCT/US2014/13049, filed Jan. 24, 2014.

* cited by examiner

ARCHITECTURE FOR SHARING BROWSING SESSION HISTORIES

BACKGROUND

Client devices may be used to request content from content servers and other network accessible systems and services. For example, a user may use a client device and a browser application to request a content page from a particular content server. The content page may be received by the client device and rendered for display to the user. Data regarding the request, such as the date, time, and particular content page requested, may be stored by the client device. The user may view the data at a later date or time, such as when the user wishes to retrieve the same page again or to determine which pages the user requested in the past. In some cases, the content page itself or portions thereof may also be stored on the client device, such as for caching purposes or for offline viewing.

Users may share data regarding their browsing histories with other users. Conventionally, users can send copies of accessed content pages or network addresses to content pages that they have accessed, such as by copying and sending a uniform resource locator (URL) of the content page to another user in an email or some other electronic message. In some cases, an add-in or toolbar may record data regarding a user's browsing history (e.g., which URLs the user enters and which hyperlinks the user activates), and allow the user to search the recorded data at a later date or time.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1A:
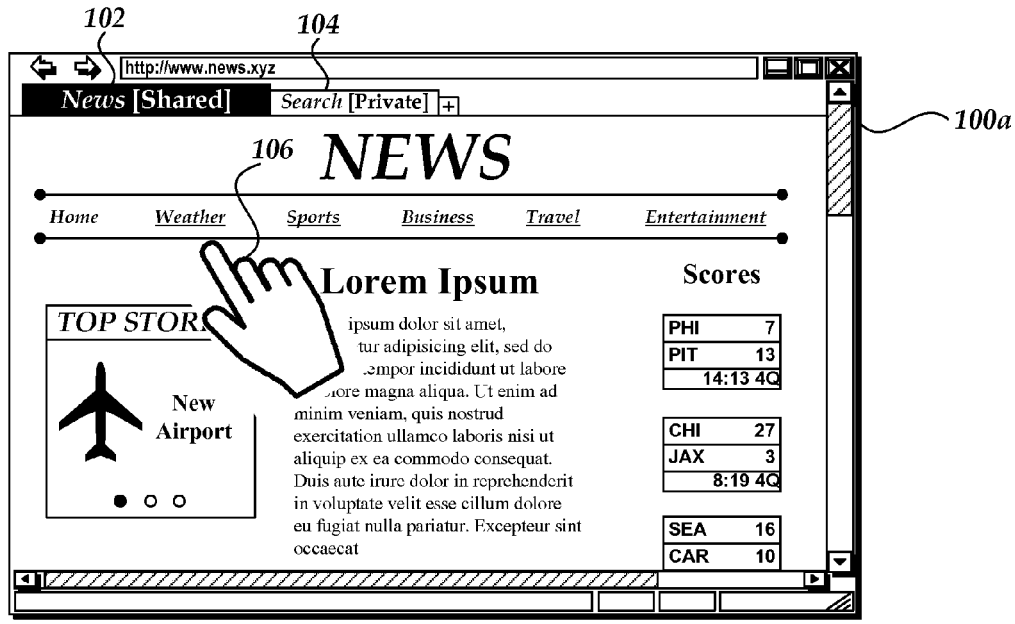
FIGS. 1A and 1B are user interface diagrams illustrating a user conducting a browsing session in a shared tab such that the content accessed in the shared tab can be saved and accessed by other users.

The present disclosure is directed to enabling users to automatically save and share data regarding browsing sessions through the use of special browser tabs or other browser interface features. Conventionally, browsers record data regarding content browsing requests and other activities in a local historical data store. In some cases, data regarding browsing requests and other activities may be provided to network-accessible servers via toolbars, add-ins, and other techniques for capturing data regarding a user's browsing activity. However, users may find it difficult to save an entire browsing session, including the actual content pages requested during the browsing session, and to provide access to the browsing sessions to other users or the general public.

Some aspects of the present disclosure relate to using a shared browser tab when conducting browsing sessions. Content requested through the shared browser tab can be saved at a network-accessible intermediary system (or other system) such that a complete snapshot of a user's browsing session may be saved. For example, a browsing session may begin, by default or in response to a user request, in a shared browser tab. Content requests, including those made in the shared browser tab, may be sent to an intermediary system rather than directly to the content server that hosts or otherwise provides access to the requested content. The intermediary system can retrieve the requested content from the content server on behalf of the user and store a representation of the content or data regarding the content in a shared browsing session data store. Subsequent content requests sent to the intermediary system can be similarly serviced and saved. A tree, graph, or other logical representation of a browsing session may be maintained so that users can easily access an overview of the browsing session at a later time, and still have the option to drill down on a particular content item. When the intermediary system saves representations of content pages as they are retrieved on behalf of the users, users can access historical representations of content pages at a later time.

Additional aspects of the present disclosure relate to searching for and accessing shared browsing sessions. Users may view browsing sessions of other users for any number of reasons, including discovering new content related to content that a user knows of, reviewing a collection of related pages recommended by a user, keeping up with information on a particular topic by viewing a curated or purposely designed browsing session, and so on. Users may access a browsing session search interface that is part of a browser application, or the search interface may be provided by a web server or other system associated with the intermediary system. Once users have identified a browsing session of interest, the user may access the browsing session such that each content page requested by the originator of the browsing session may be viewed, in some cases in the same order in which the original user viewed them. For example, the "next" and "back" browser controls can take the subsequent user to the same pages that those controls would have taken the original user had the original user activated one of the controls while viewing the currently displayed content page.

Further aspects of the present disclosure relate to tracking data regarding characteristics of the client device used during a browsing session, and using such characteristics as search parameters during subsequent searches for shared browsing sessions. For example, data regarding the form factor, display size, geographic location, and other characteristics of a client device may be recorded with the shared browsing session. When a user later searches for shared browsing sessions, the user may specify device characteristics in order to receive more relevant search results. For example, a user in a certain geographic location may want to view browsing sessions of users in the same geographic location because such browsing sessions may be more likely to include relevant information.

Although aspects of the embodiments described in the disclosure will focus, for the purpose of illustration, on use of a shared browser tab to access content and automatically save the accessed content as a shared browsing session, one skilled in the art will appreciate that the techniques disclosed herein may be applied to any number of interfaces, process, or applications. For example, a separate browser window, rather than a separate shared browsing tab, may be used when conducting a shared browsing session. As another example, the browser may include controls that enable a user to may manually select which browsing sessions or portions thereof to share with other users. Various aspects of the disclosure will now be described with regard to certain examples and embodiments, which are intended to illustrate but not limit the disclosure.

With reference to an illustrative embodiment, a client device may execute a browser application. A user may interact with the browser application to request content items, such as web pages or other types of documents, hosted by content servers. FIG. 1A illustrates a browser application user interface 100a displaying a content item. The content item is displayed in a shared browser tab 102. Content accessed and displayed in the shared browser tab 102 is automatically saved in a shared browsing session that may be accessed at a later time by the same user and/or by other users. As seen in FIG. 1A, a private browser tab 104 may also be used. When a user wishes to access content that is personal or that the user otherwise does not want to be made public, the user may use the private browser tab 104 to do so.

In some embodiments, the browser may provide controls to enable the user, when opening a new tab or beginning a new browser session, to select between opening or using a shared and private tab. In some embodiments, a control, menu option, touch screen gesture, voice command or other input technique may be supported that allows a user to either convert a shared browser tab into a private tab (or vice versa), or move a current session over from the shared browser tab to the private tab (or vice versa). Such functionality may be desirable if, for example, a user decides, while viewing a page, that the page should not be included in the shared browsing session. In some cases, a "back and forget" control or other function may be provided which, in addition to going back to the previously displayed content item, causes the current page to be omitted from the shared browsing session.

When a user initiates a content request in a shared browser tab 102, the content request may be sent to an intermediary system rather than directly to a content server associated with the requested content item. For example, a user may enter a URL into an address bar of a browser application. The URL may be transmitted to an intermediary system with which the browser, client device, or user is associated. The intermediary system may retrieve the requested content at the URL on behalf of the user and return the requested content to the user. In addition, the intermediary system may record data about the request because the request was initiated from a shared browser tab 102. The intermediary system may store a representation of the requested content that can be shared with other users as part of the shared browsing session. For example, the complete content page itself may be stored, in some cases in compressed format. In some embodiments, a simplified or smaller version (e.g., a version that consumes less storage space) of the content page may be stored, such as a snapshot or a text-only representation.

When a user initiates a content request in a private browser tab 104, the content request may or may not be sent to an intermediary system. For example, a browser application may be configured to retrieve content requested in a private browser tab 104 directly from the content server. In some embodiments, a browser application or client device may be configured to transmit all content requests to an intermediary system rather than directly to the content servers. In such cases, even those requests made in private browser tabs 104 may be sent to the intermediary system with information identifying the requests as private. The intermediary system may retrieve the requested content on behalf of the user, similar to the content request processing described above with respect to the shared browser tab 102. However, rather than saving a representation of the content, the intermediary system may simply return the requested content to the client device. In some embodiments, the requested content item may be stored at the intermediary system and marked as private such that the user may search for and access the content or an entire private browsing session at a later time. In such cases, the user may later identify the content item or entire private browsing session as a shared browsing session that can be accessed by certain users or by the general public.

Figure 1B:
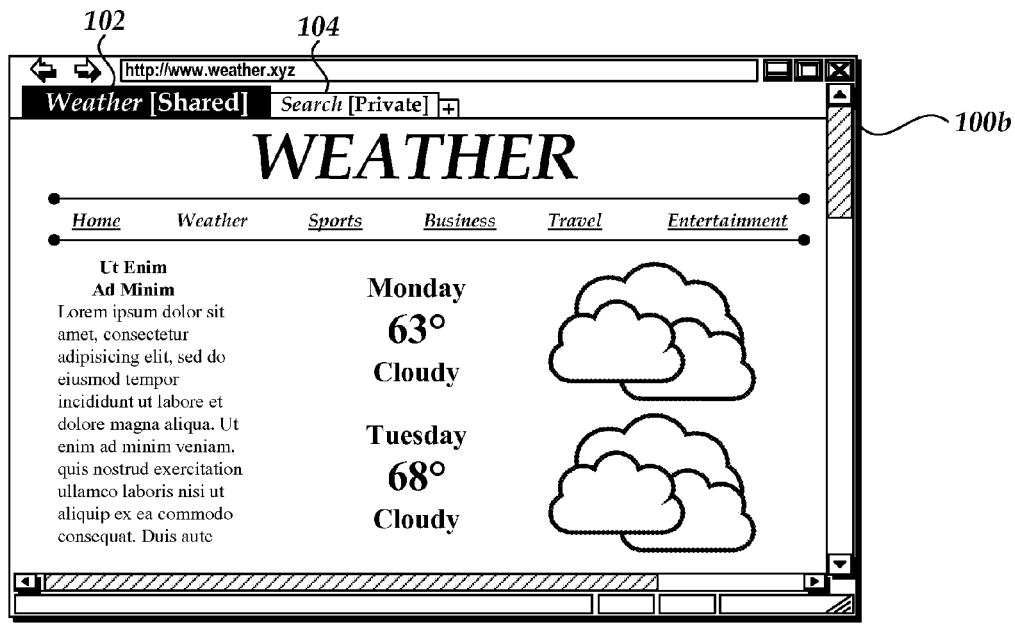

As seen in FIG. 1A, the user 106 may activate a link or otherwise request another content item. For example, the user 106 is viewing a "news" content page in the shared browser tab 102. The user 106 may activate a link to view a "weather" content page. The weather-related content page may be retrieved by the intermediary system as described above, and returned to the client device. FIG. 1B shows the display of a weather-related content page in the shared browser tab 102 as a result of such a request. A user may continue to activate links and request content in the shared browser tab until the user completes the browsing session.

Subsequent to the creation of a shared browsing session, the browsing session may be made available for other users to search for and access. Users may access a search interface that is part of a browser application or that is provided by a shared browsing session system (e.g., the intermediary system or some other system associated therewith). Search results may be shown, and a user may select a particular shared browsing session to view. The user may view an overview of the browsing session (e.g., a list of content accessed and, optionally, data about the content). In addition, the user may access the browsing session such that the user can view one or more of the content pages originally accessed in the browsing session. The content pages viewed in conjunction with the shared browsing session may be current versions of the content pages, or they may be representations of content pages from the time at which they were originally accessed in the browsing session.

Figure 2A:
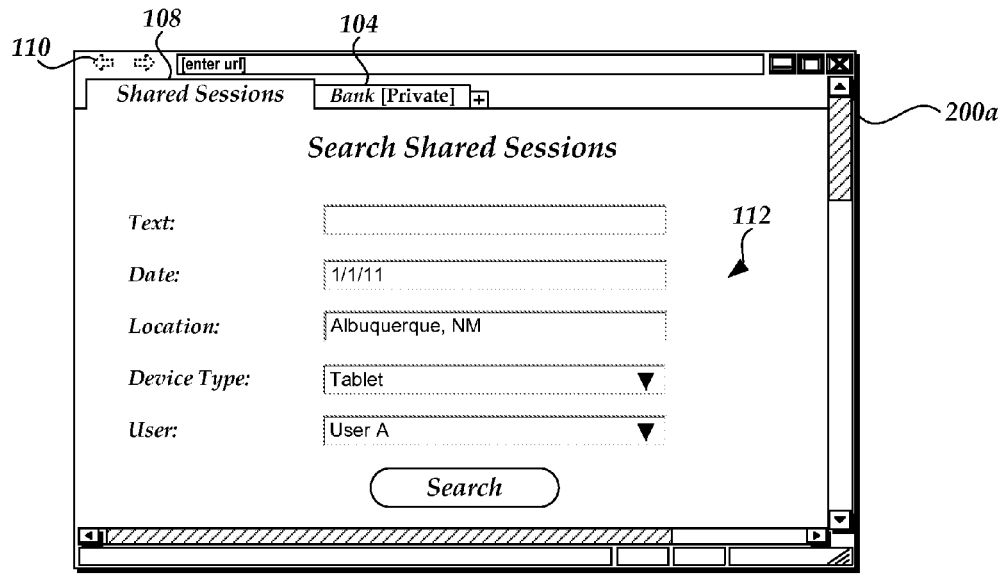
FIG. 2A is a user interface diagrams illustrating a user searching shared browsing histories based on various criteria.

FIG. 2A shows an illustrative user interface 200a for searching shared browsing sessions. As described above, the interface 200a may be provided by the browser application itself, or it may be a network-accessible interface provided by an intermediary system or a shared browsing session system associated therewith. The interface 200a illustrated in FIG. 2A includes input fields 112 for entering search criteria for the shared browsing sessions. For example, the input fields 112 may include controls for entering text that may be present on any of the content pages of a shared browsing session, a control for searching shared browsing sessions that occurred on a particular date or within a particular date range, a control for searching shared sessions conducted from a particular geographic location or with a particular device type (e.g., desktop computer, tablet, smart phone), and a control for searching shared sessions created by a particular user or group of users.

Figure 2B:
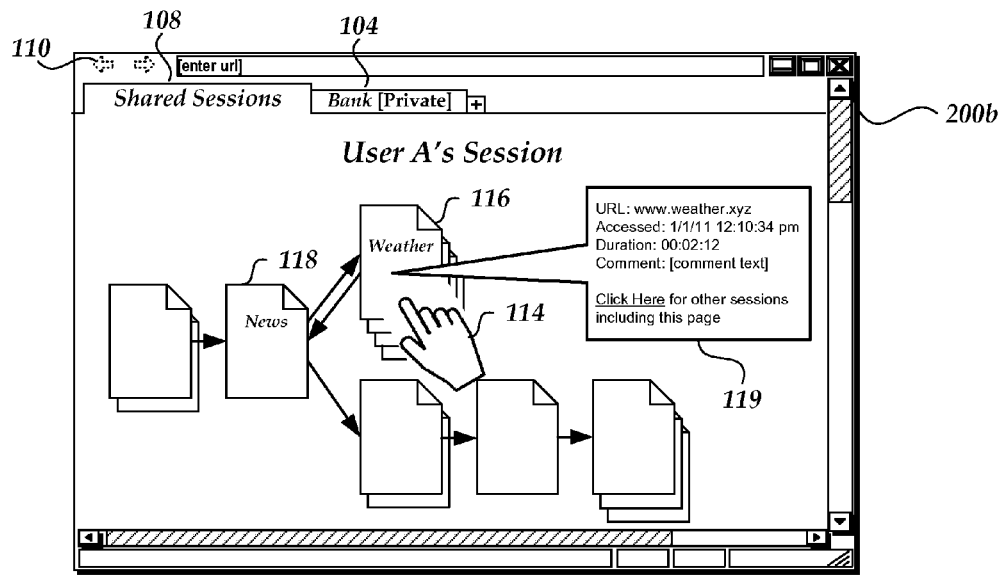
FIG. 2B is a user interface diagrams illustrating a user viewing browsing trees and other data about a shared browsing session.

FIG. 2B shows an overview of a particular shared browsing session that may have been returned in results to a search. The overview may present the content items accessed in the shared browsing session in a graph or tree format so that other users may see the order in which content pages were accessed, which content pages were accessed from the same content server, domain, or web site, and so on. The graphical representation in FIG. 2B is illustrative only, and not intended to be limiting. In some embodiments, other graphical representations may be used. In additional embodiments, no graphical representation of the shared browsing session may be presented.

In some embodiments, information may be displayed about some or all of the content pages that make up the shared browsing session. For example, an information balloon 119 may be associated with a selected content page 116. The information balloon 119 may present information about the selected content page 116 that was recorded at or around the time the selected content page 116 was accessed during the shared browsing session. The information may include general information about the content page (e.g., the URL, the date and time at which it was accessed, and the duration of time the content page was displayed on the client device). Alternatively, or in addition, the information may include a comment or tag entered by the originating user of the shared browsing session, such as notes the user saved regarding the content page, or a tag that the user applied to the page to associate the page with a particular subject or category. In some embodiments, a user may tag or otherwise associated a description to a shared browsing session as a whole. For example, when a user closes a shared browser tab, the browser may prompt the user to type in a textual label or description. The tag may then be used in the search criteria when searching for shared sessions. In some embodiments, user interface controls or features may be provided such that a user may annotate particular pages within the shared session. The annotations may be viewable by others who later view the shared session.

In some embodiments, information may also be provided regarding similar content pages and/or similar browsing sessions. For example, the information balloon 119 displays a link to other shared browsing sessions that include the selected content page 116. As another example, a listing of browsing sessions that include similar content pages or a threshold number of the same content pages may be presented. The listing of additional browsing sessions may be provided so that users may view browsing sessions that may not have been returned in the search results but which, nonetheless, may be relevant in light of the markup of a currently viewed shared browsing session.

Figure 3A:
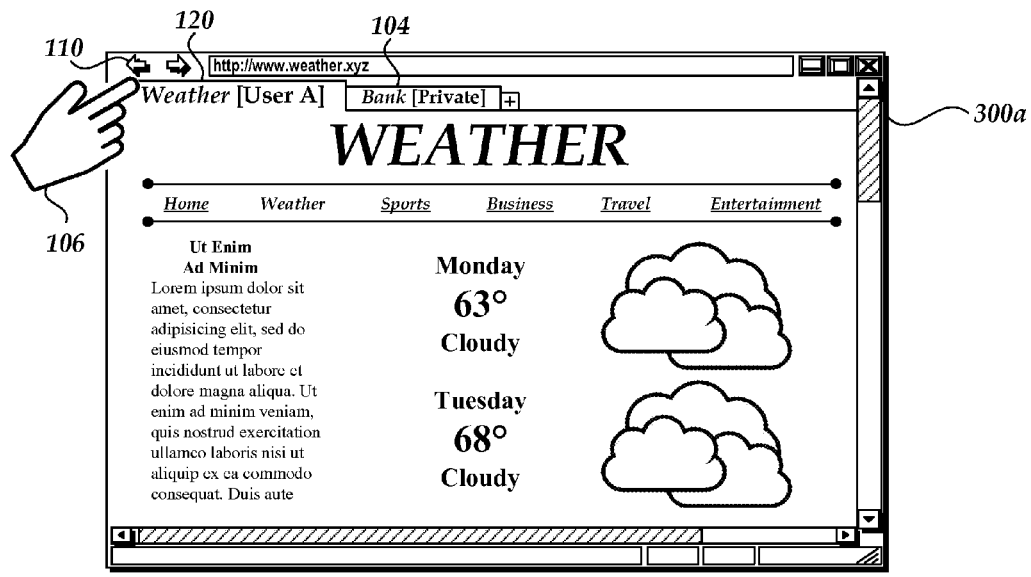
FIGS. 3A and 3B are user interface diagrams illustrating a user viewing a shared browsing session of another user.

As shown in FIG. 2B, a user 114 may select particular content page 116 fore viewing. FIG. 3A shows a user interface 300a displaying the selected content page 116 from FIG. 2B. In particular, the content page displayed in the user interface 300a of FIG. 3A is a representation of the content page from the time it was originally accessed as part of the shared browsing session, shown in FIG. 1B. The user interface 300a can indicate that the content page is being displayed as part of a shared browsing session by displaying it in a shared browsing session display tab 120. In some embodiments, the shared browsing session display tab 120 or some other element of the user interface 300 (e.g., a title bar of the browser application) can display information about the shared browsing session, such as the name of the user that originated the shared browsing session, the date at which the content page was originally accessed, etc.

In addition, the user interface 300a may include "back" and "forward" controls 110. Conventionally, such controls allow a user to return to previously accessed content pages in the current browsing session by activating the "back" control. Users may then return to more recently accessed content pages by activating the "forward" control. When viewing a shared browsing session, a user may use the "back" and "forward" controls (or a corresponding menu option, keyboard command, voice command, or touch screen gesture) to access other pages that were part of the shared browsing session. For example, if the user initially activates the shared browsing session from the first page of the shared browsing session, activating the "forward" button will allow the user to progress through the browsing session and see subsequently requested content. When a fork in the browsing session is reached (e.g., the originating user accessed two or more pages from the currently displayed browsing session), the user may be presented with an option regarding which branch to follow. In some cases, rather than re-creating such forks and branches, a shared browsing session may be provided in a linear fashion, with each page being included in the same order in which they were accessed (e.g., some pages may be included in the shared browsing session twice if the originating user went back to them and then followed a different path).

Figure 3B:
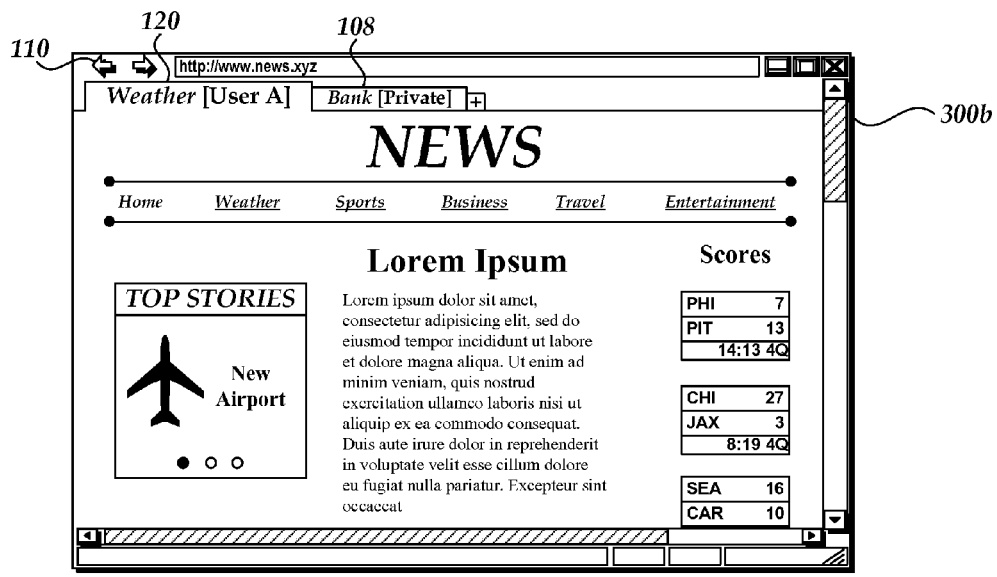

The "back" and "forward" controls 110 can also provide such contextual navigation if a user initially requests display of a content page that was not at the beginning of a browsing session, but rather somewhere in the middle or at the end. For example, with reference to FIG. 3A, the user can activate the back control 110 when viewing the selected "weather" content page of the shared browsing session. In response, the browser can navigate to the content page of the shared browsing session that the originating user accessed immediately prior to the "weather" content page, even though the current user viewing the shared browsing session has not yet accessed the previous page and, therefore, would not typically be able to go "back" to the page. FIG. 3B shows the result of such navigation, with the "news" content page displayed in the shared browsing session tab 120. The "news" content page is displayed because the originating user accessed the "news" content page immediately prior to accessing the "weather" content page, as described above and illustrated in FIGS. 1A and 1B.

Networked Content Delivery Environment

Figure 4:
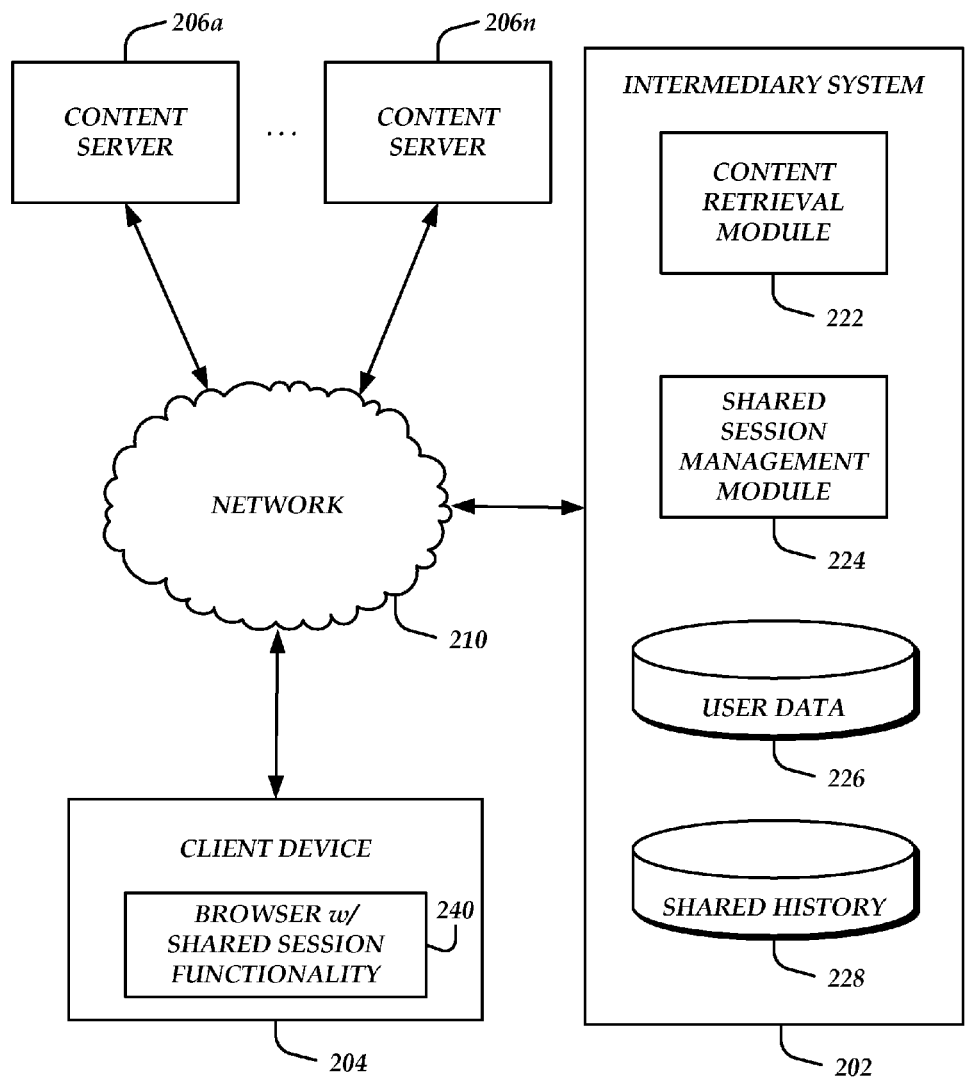
FIG. 4 is a block diagram of an illustrative content delivery environment showing various modules and data stores of a client device and an intermediary system configured conduct and save shared browsing sessions.

Turning now to FIG. 4, an example content delivery environment in which features can be implemented for saving and accessing shared browsing sessions will be described. The content delivery environment can include an intermediary system 202, a client device 204, and any number of content servers 206a-206n. The various systems may communicate with each other via a communication network 210. The network 210 may be a publicly accessible network of linked networks, possibly operated by various distinct parties, such as the Internet. In other embodiments, the network 210 may include a private network, personal area network, local area network, wide area network, cable network, satellite network, cellular telephone network, etc. or combination thereof, each with access to and/or from the Internet.

The intermediary system 202 can be any computing system that can retrieve content from content servers 206, store the content or information about the content, and transmit the content to the requesting client device 204. One example of such an intermediary system is described in U.S. patent application Ser. No. 13/246,806, filed on Sep. 27, 2011 and incorporated herein by reference in its entirety.

The intermediary system 202 may be an intermediary between client devices 204 (one shown) and content servers 206. For example, the notification system 202 may be an intelligent proxy server, a system operated by an internet service provider (ISP), or some other device or group of devices that retrieve content on behalf of client devices 204.

The intermediary system 202 can include a number of components, such as a content retrieval module 222, a shared session management module 224, a user data store 226, and shared history data store 228. In some embodiments, the intermediary system 202 may include additional or fewer components than illustrated in FIG. 4. For example, the intermediary system 202 may include or otherwise be associated with various additional computing resources, such as content servers 206, content delivery network (CDN) systems, internet service providers (ISPs), and the like.

The intermediary system 202 may include multiple computing devices, such as computer servers, logically or physically grouped together. The components of the intermediary system 202 can each be implemented as hardware, such as a server computing device, or as a combination of hardware and software. In addition, the components of the intermediary system 202 can be combined on one server computing device or separated individually or into groups on several server computing devices. In some embodiments, the intermediary system 202 can include multiple instances of a single component (e.g., multiple shared session management modules 224). In further embodiments, the intermediary system 202 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The client devices 204 can correspond to a wide variety of computing devices, including personal computing devices, laptop computing devices, hand held computing devices, terminal computing devices, mobile devices (e.g., mobile phones, tablet computing devices, etc.), wireless devices, electronic readers, media players, and various other electronic devices and appliances. A client device 204 may be configured with a browser application 240 to communicate via the network 210 with other computing systems, such as the intermediary system 202 or content servers 206, and to request, receive, process, and display content. Illustratively, the browser application 240 may provide shared browsing session functionality, such as shared browsing tabs, a search interface for searching shared browsing session, and the like.

The content servers 206 can correspond to logical associations of one or more computing devices for hosting content and servicing requests for the hosted content over the network 210. For example, a content server 206 can include a web server component corresponding to one or more server computing devices for obtaining and processing requests for content (such as content pages) from the client device 204, the intermediary system 202, or other devices or service providers. In some embodiments, one or more content servers 206 may be associated with a CDN service provider, an application service provider, etc.

Figure 5:
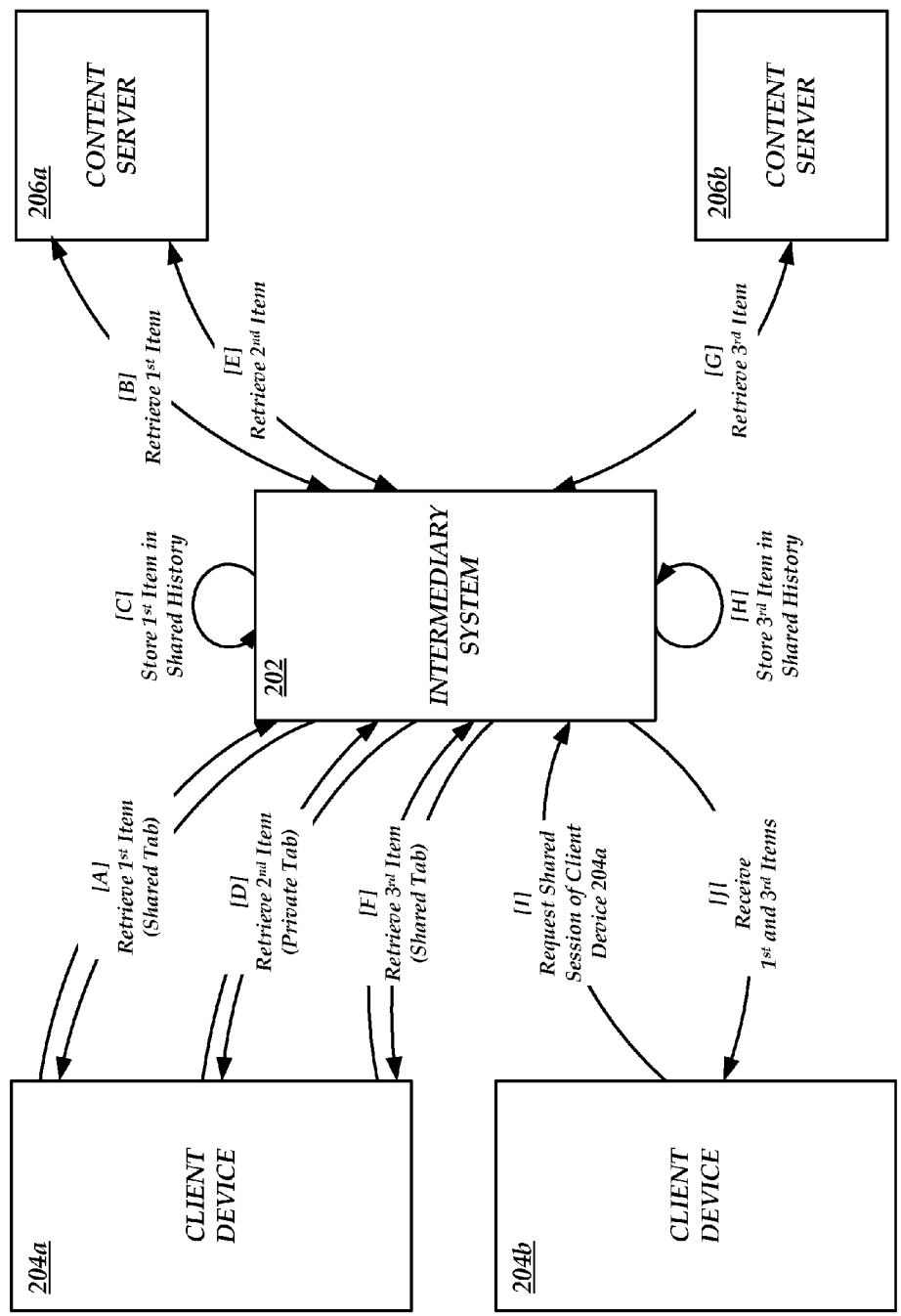
FIG. 5 is a block diagram of an illustrative content delivery environment including multiple client devices, an intermediary system, and multiple content servers, showing various interactions and data flows between the devices and systems.

FIG. 5 illustrates example interactions and data flows between multiple client devices 204a-204b, an intermediary system 202, and multiple content servers 206a-206b. As seen in FIG. 5, request for a first content item, initiated from a shared browser tab of a browser 140, may be transmitted to the intermediary system 202 at (A). The request may be for a content item hosted by content server 206a. The content retrieval module 222 or some other component of the intermediary system 202 can retrieve the first content item from the content server 206a at (B).

The intermediary system can store the first content item at (C) so that it may be accessed at a later time in a subsequent browsing session. For example, the intermediary system 202 can store the first content item in the shared history data store 228. Before or after storing the first item, or in parallel with storing the first content item, the intermediary system 202 can transmit the first content item to the client device 204a.

Subsequently, the client device 204a can request a second content item at (D). In this case, the user of the client device 204a may initiate the request for the second content item, hosted by the same content server 206a as the first content item, from a private browser tab. The request may be marked as private or, alternatively, it may not be marked as shared. For example, data may be inserted into a Hypertext Transfer Protocol ("HTTP") header of the request identifying the request as private (or, in the case of requests made from shared browsing tabs, identifying the request as a request associated with a shared browsing session). The intermediary system 202 may retrieve the second content item from the content server 206a at (E). Because the request is a private request (or, because it is not marked as a shared browsing session request), the intermediary system 202 may return the second content item to the client device 204a as requested, and not store the second content item in the shared history data store 228 as it would with a content item in a shared browsing session. In some embodiments, the intermediary system 202 may store the second content item even though it is not part of a shared browsing session. The intermediary system 202 may mark the content item as "private," or, alternatively, the intermediary system 202 may not mark the content item as "shared," so that the content item is not returned in response to shared browsing session search results.

Subsequently, the client device 204a can request a third content item at (F). In this case, the user of the client device 204a may initiate the request for the third content item, hosted by a different content server 206b, from a shared browser tab. The request may be marked as shared or, alternatively, it may not be marked as private (e.g., data may be included in an HTTP header of the request, as described above). The intermediary system 202 may retrieve the third requested content item from the content server 206b at (G), and return it to the client device 204a. In addition, the intermediary system 202 may save the third content item or a representation thereof as part of a shared browsing session, similar to saving the first content item as described above.

A user of client device 204b may access the shared session, including the first or third content items, at (I). As described above with respect to FIGS. 2A-2B, the user may access a search interface and receive a listing of matching browsing sessions from which to choose. The user may select a particular browsing session to receive in whole or in part. The intermediary system 202 can return the first and third content items, or any other content items associated with the shared browsing session, at (J).

In some cases, the user may be a different user than the originating user, and the user may be using a different client device 204b. In other cases, the user may be using the same client device 204a as was used when the shared browsing session was created. In still other cases, the user may be the originating user, using either the same client device 204a or a different client device 204b.

In some embodiments, the intermediary system 202 may be omitted, in which case the shared browsing session functionality may be implemented by a server system that does not operate as an intermediary. In such a system, when the browser sends a content request to a content server, it would also send it (at the same time or as part of a batch later on) to a separate shared session history server. Subsequently, when users wish to search for shared browsing session, they may contact the separate shared session history server to retrieve information regarding the shared sessions, as described herein with respect to the intermediary system 202.

Shared Browsing Session Management Process

Figure 6:
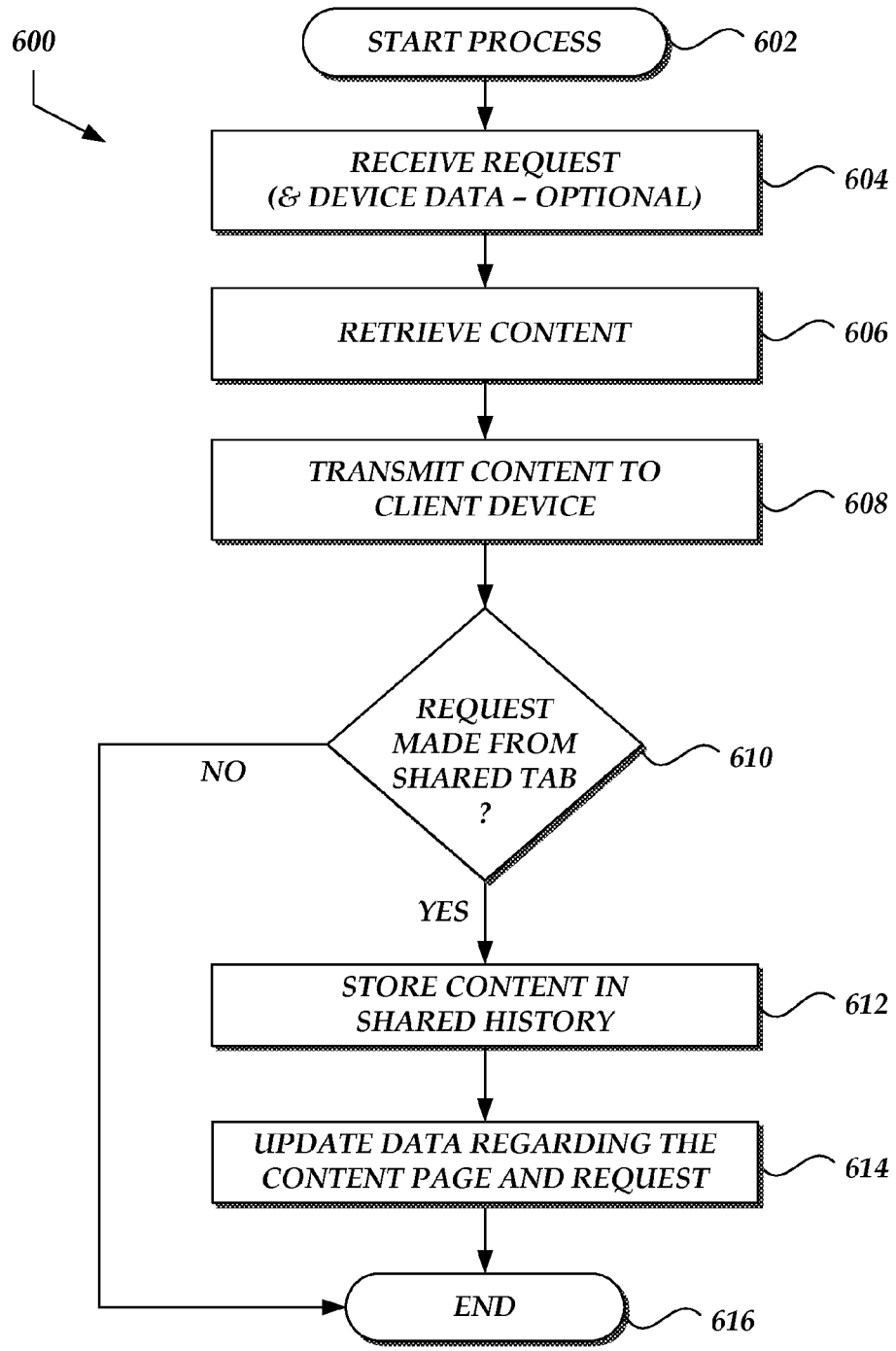
FIG. 6 is a flow diagram of an illustrative process for processing browsing session requests and saving requested content or data regarding the requested content for later access as part of a shared browsing session.

FIG. 6 illustrates a sample process 600 for processing a shared browsing session. Advantageously, an intermediary system 202 may execute the process 600 or portions thereof to save requested content pages or data regarding the requested content pages as shared browsing sessions. The shared browsing session may later be accessed, in whole or in part, by the originating user or by other users.

The process 600 begins at block 602. The process 600 may begin with the initiation of a browsing session on a client device 204 (e.g., a browser 140 begins executing and notifies the intermediary system 202 that a shared browsing session is beginning). Data regarding the user, browser 140, or client device 204 may be sent to the intermediary system 202 so that the intermediary system can ensure that the shared browsing session is associated with the appropriate user or account. For example, the user may enter log in credentials, or the information regarding the user may automatically be sent to the intermediary system 202. The intermediary system 202 may authenticate the user using data in the user data store 226. In some embodiments, the process 600 is initiated with the receipt of a content request at block 604, and executes in response to each individual request from a client device 204.

At block 604, the intermediary system 202 can receive a content request from a client device 204. As described above, the content request may include a URL of a content item to be retrieved. At block 606, the intermediary system 202 can retrieve the requested content on behalf of the client device 204, and at block 608 the intermediary system 202 can transmit the requested content back to the client device 204 as requested.

At decision block 610, the intermediary system 202 can determine whether the request was made from a shared tab. As described above, the request from the client device 204 can include data regarding whether it was made from a shared tab, or whether it was made from a private tab. For example, data can be added to an HTTP header, if the request is transmitted to the intermediary system as an HTTP GET request. Data can be added to the request in other ways if the request is formatted and/or transmitted according to a different protocol. Using the data, the intermediary system 202 can determine whether or not the request was made from a shared browser tab. If so, the request is part of a shared browsing session, and the process 600 proceeds to block 612. Otherwise, the request is not part of a shared browsing session, and the process 600 can terminate.

At block 612, the intermediary system 202 can store the retrieved content, or a representation of the retrieved content, in a data store so that it may be accessed in the future. For example, the entire content page, or just a Hypertext Markup Language ("HTML") or other file defining the content page, may be stored in a shared history data store 228. In some cases, a snapshot of the content page may be stored or only a portion of the content page may be stored (e.g., a digest of the page or only the text of the page). In some embodiments, the content page or a representation thereof at the time it was originally accessed is not stored or provided to users when viewing a shared browsing sessions. Rather, only the URL or some other identifier of the content page is provided, and the users can retrieve a current version of the page. In other embodiments, neither the original content page nor a URL or identifier of the content page is provided to users when viewing a shared browsing session. Rather, data about the content page is stored by intermediary system 202, and when a user subsequently requests to view a shared browsing session or a portion thereof, the intermediary system 202 retrieves a current version of the content page (or data regarding a current version of the content page) and transmits the current version to the requesting client device 204.

At block 614, the intermediary system 202 may store additional data regarding the browsing session, such as updating a browsing session tree (e.g., the links between requested content pages and other data regarding the order in which content pages were accessed). For example, each content page (or data about the content page) may be stored with data referencing the browsing session to which the content page applies, content that was requested before the content page, the date and time that the content page was requested, and the like. In addition, data may be transmitted from the client device 204 to the intermediary system with subsequent requests or outside of the process 600 altogether. For example, data regarding the duration of time that a particular content page was displayed on the client device, content that was requested after or linked from the content page, and the like may be provided to the intermediary system 202, and the intermediary system 202 may store such data. Subsequently, the data may be used to search for shared browsing sessions and provided to users for informational purposes.

In addition, the intermediary system may store data regarding the characteristics of the requesting client device 204. For example, data regarding the device characteristics may be included in the HTTP header or otherwise associated with the request form the client device, or the request may be associated with data that is stored in the user data store 226. Device characteristics can include form factor, display size, display resolution, input or output capabilities, network connection, geographic location, browser type, and the like.

Additional Embodiments

In some embodiments, a browser toolbar or plug-in may be used to provide the shared session functionality described above, rather than via native browser functionality. For example, a conventional browser application may be customized to perform various processes and provide various features related to shared browsing sessions by installing a browser plug-in.

In some embodiments, an originating user may specify which particular users or groups of users may access the originating user's shared browsing sessions or a particular shared browsing session. For example, an originating user may create a shared browsing session including content relevant to the user's job, family, school, or circle of friends. The user may provide access to the shared browsing session to only those users in the appropriate target group.

In some embodiments, certain content requested in a shared browser tab may be excluded from a shared browsing session. Content pages related to banking, email, and the like may be detected by the browser 140 or by the intermediary system 202, and such content pages may be excluded from the shared browsing session by default. In some cases, a user can override this behavior permanently or on an ad hoc basis, such as when the user wishes to shared such typically personal content.

In some embodiments, the browser or a browser component (such as a toolbar or add-in) may be associated with or integrated with a social networking system. In such cases, a user may publish data regarding the user's shared browsing session to the user's social network profile, or share data regarding the user's shared browsing sessions with social networking contacts.

In some embodiments, users may communicate regarding the shared session, either interactively or asynchronously. The intermediary system 202, some other system, or the browser application 240 may provide an interface that users may use to post comments or add annotations to content in a shared browsing session. These messaging features can allow users to discuss a shared session or a particular page from the same browser application 240 that they are using to view the shared browsing session, thereby avoiding the use of unnecessary programs, windows, and the like.

For example, the originating user may add a comment or annotation to a particular content page. Subsequent viewers of the page may see the annotation (e.g., as a balloon or overlay), and then comment on the page, add their own annotations to the page, and the like. The subsequent comments and annotations may be stored at the intermediary system 202 and made accessible to subsequent users for a specified period of time or indefinitely. Comments may be appended to the end of the page so that they appear to be part of the original page, or a separate pane of the browser 240 display may be used to show the comments and provide features for adding, editing, and responding to comments. The originating user may be notified that a comment or annotation has been added to a content page of the originating user's shared browsing session.

Interactive messaging may be used in conjunction with shared sessions instead of, or in addition to, the asynchronous messaging described above. Popup windows, messaging frames, separate browser panes, or other messaging areas may be displayed to two or more simultaneous viewers of a shared session. Users can send messages to each other or to all current viewers of the shared session. One example of a system that facilitates real-time collaboration between viewers of content pages is described in U.S. patent application Ser. No. 13/246,557, filed on Sep. 27, 2011 and titled Remote Co-Browsing Session Management, the contents of which are hereby incorporated by reference in their entirety.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by one or more processors or computing devices, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

For example, the process described with respect to FIG. 6 may be embodied in a set of executable program instructions stored on a computer-readable medium, such as one or more disk drives, of the computing system with which the intermediary system is associated. When the process is initiated, the executable program instructions can be loaded into memory, such as RAM, and executed by one or more processors of the computing system. In some embodiments, the computing system may include multiple computing devices, such as servers, and the process may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system that acts as an intermediary between client devices and content servers, the computer system comprising one or more computing devices, wherein the computer system is programmed to at least:

maintain, in a shared data store, a record of a shared browsing session, the record including copies of a plurality of content pages accessed during the shared browsing session and comprising data specifying a sequence in which the plurality of content pages were accessed during the shared browsing session;

obtain a particular content page, from a content server, in response to a content request from a client device associated with an originating user;

determine that the content request is a shared content request based at least partly on information received from the client device;

store a copy of the particular content page in the shared data store of the computer system, the copy representative of the particular content page as obtained from the content server;

respond to an access request, from a second client device associated with a second user, for shared content by providing access to the shared browsing session; and provide, for presentation on the second client device, a graphical representation of the shared browsing session, indicating the sequence in which the content pages were accessed, through which the second user can request a stored copy of a content page.

2. The system of claim 1, wherein the access request for shared content comprises a query for content pages associated with one or more characteristics.

3. The system of claim 2, wherein the one or more characteristics comprises subject matter, request date, or originating user.

4. The system of claim 1, wherein the access request for shared content comprises a query for content pages requested by client devices associated with one or more characteristics.

5. The system of claim 4, wherein the one or more characteristics comprises form factor, geographic location, or output capabilities.

6. The system of claim 1, wherein the computer system is further programmed to enable the originating user to specify access permissions to the shared browsing session.

7. The system of claim 1, wherein the graphical representation comprises selectable representations of each of the content pages and links between the representations of content pages indicating in which the content pages were accessed.

8. A computer-implemented method comprising:

maintaining, in a shared data store, a record of a shared browsing session, the record including copies of a plurality of content items accessed during the shared browsing session and comprising data specifying a sequence in which the plurality of content items were accessed during the shared browsing session;

in response to a content request from a first client device:
obtaining a particular content item from a content server for transmission to the first client device,
determining that the content request is a shared content request, and
storing a copy of the particular content item in the shared data store, the copy representative of the particular content item as obtained from the content server;

receiving an access request from a second client device for shared content; and providing the second client device with access to the shared browsing session including providing, for presentation on the second client device, a graphical representation of the shared browsing session, indicating the sequence in which the content items were accessed, through which the second user can request a stored copy of a content item.

9. The computer-implemented method of claim 8, wherein a content item comprises a web page.

10. The computer-implemented method of claim 8, wherein the copy of the particular content item comprises an unmodified version of the particular content item, at least a portion of the particular content item, a screenshot of the particular content item, or a text-only representation of the particular content item.

11. The computer-implemented method of claim 8, wherein determining that the content request is a shared content request is based at least partly on data associated with the content request.

12. The computer-implemented method of claim 8, wherein determining that the content request is a shared content request is based at least partly on receiving the content request during the shared browsing session associated with the first client device.

13. The computer-implemented method of claim 8, wherein the shared content request is associated with an originating user, the computer-implemented method further comprising enabling the originating user to specify access permissions for the shared browsing session.

14. The computer-implemented method of claim 8, wherein the access request for shared content comprises a query for content items associated with one or more characteristics.

15. The computer-implemented method of claim 14, wherein the one or more characteristics comprises subject matter, request date, or originating user.

16. The computer-implemented method of claim 8, wherein the access request for shared content comprises a query for content items requested by client devices associated with one or more characteristics.

17. The computer-implemented method of claim 16, wherein the one or more characteristics comprise form factor, geographic location, or output capabilities.

18. The method of claim 8, wherein the graphical representation comprises selectable representations of each of the content items and links between the representations of content items indicating the sequence in which the content items were accessed.

19. A non-transitory computer storage medium comprising a browser module configured to execute a process on a client device, the process comprising:

providing a shared browser tab, wherein copies of content items displayed in the shared browser tab are stored, with data specifying a sequence in which the content items are displayed, by a server computing device as a shared browsing session from which the copies can be accessed by other client devices at a future time using a graphical representation of the shared browsing session, the copies comprising representations of the content items as displayed in the shared browser tab;

transmitting a content request for a particular content item, the content request associated with the shared browser tab; and receiving the requested particular content item, wherein a copy of the particular content item is stored by the server computing device.

20. The non-transitory computer storage medium of claim 19, wherein the particular content item comprises a web page.

21. The non-transitory computer storage medium of claim 19, wherein the content request is initiated by one of: activation of a link displayed in the shared browser tab and entry of a uniform resource locator ("URL") while the shared browser tab is active.

22. The non-transitory computer storage medium of claim 19, wherein the process further comprises providing a private browser tab, wherein copies of content items displayed in the private browser tab cannot be accessed by other client devices.

23. The non-transitory computer storage medium of claim 19, wherein the process further comprises:
   providing an interface for requesting copies of content items displayed within a second shared browser tab on a second client device;
   transmitting, to the server computing device, a request to access the copies of content items displayed within the second shared browser tab of the second client device; and
   receiving, from the server computing device, the requested copies.

24. The non-transitory computer storage medium of claim 23, wherein the requested copies enable the client device to display representations of one or more content items displayed in the second shared browser tab of the second client device.

25. The non-transitory computer storage medium of claim 19, wherein the browser module comprises a browser plug-in.

26. The non-transitory computer storage medium of claim 19, wherein the graphical representation comprises selectable representations of each of the content items and links between the representations of content items indicating the sequence in which the content items were displayed.

27. A system for enabling users to selectively share information regarding their browsing sessions with other users, the system comprising:
   a browser component configured to run on user computing devices, said browser component providing a shared browsing tab and a non-shared browsing tab, said shared browsing tab enabling users to conduct shared browsing sessions in which content items requested in respective shared browsing sessions are recorded and made accessible to other users through use of graphical representations of respective shared browsing sessions indicating the respective sequence in which the respective content items were accessed, said non-shared browsing tab enabling users to conduct browsing sessions that are not made available to other users; and
   a server system configured to record the shared browsing sessions conducted in the shared browsing tabs by storing, for respective shared browsing sessions, copies of content items, and data specifying a sequence in which the content items were accessed during the shared browsing session, as retrieved by the browser component executing on a user computing device, and to make the shared browsing sessions available such that the copies of content items as retrieved by the browser component executing on the user computing device are shared among one or more other user computing devices at a future time, said server system comprising one or more computing devices.

28. The system of claim 27, wherein the server system is also configured to record the browsing sessions conducted by users in the non-shared browsing tab, and to maintain said sessions conducted in the non-shared browsing tab private to the respective users.

29. The system of claim 27, wherein the server system acts as an intermediary between at least some of the user computing devices and content items.

30. The system of claim 27, wherein the server system is further configured to:
   receive, from a first user computing device, a message regarding a first shared browsing session;
   store the message; and
   subsequently, transmit the message to a second user computing device in response to a request for at least a portion of the first shared browsing session.

31. The system of claim 27, wherein a copy of a content item comprises an unmodified version of the content item, at least a portion of the content item, a screenshot of the content item, or a text-only representation of the content item.

32. The system of claim 27, wherein a graphical representation of a shared browsing session comprises selectable representations of each of the content items accessed during the shared browsing session and links between the representations of content items indicating the sequence in which the content items were accessed.

* * * * *